US007042603B2

(12) United States Patent
Masao et al.

(10) Patent No.: US 7,042,603 B2
(45) Date of Patent: May 9, 2006

(54) INFORMATION PROCESSING APPARATUS, IMAGE INPUT APPARATUS, METHOD OF CONTROLLING IMAGE PROCESSING APPARATUS, METHOD OF CONTROLLING IMAGE INPUT APPARATUS, IMAGE INPUT SYSTEM, AND STORAGE MEDIUM

(75) Inventors: Nozomi Masao, Saitama (JP); Kazuo Otani, Saitama (JP)

(73) Assignee: Canon Electronics Inc., (JP)

( * ) Notice: Subject to any disclaimer, the term of this patent is extended or adjusted under 35 U.S.C. 154(b) by 873 days.

(21) Appl. No.: 09/966,771

(22) Filed: Sep. 28, 2001

(65) Prior Publication Data

US 2002/0093699 A1 Jul. 18, 2002

(30) Foreign Application Priority Data

Sep. 28, 2000 (JP) .............................. 2000-297463

(51) Int. Cl.
*G03F 3/08* (2006.01)
(52) U.S. Cl. .................... 358/519; 358/505; 358/474; 358/518; 358/530; 358/448; 358/524; 358/523; 358/1.15; 382/254; 382/167; 382/274
(58) Field of Classification Search ............... 358/505, 358/474, 527, 516, 518, 519, 461, 521, 530, 358/448, 524, 523, 498, 471, 1.13, 400, 487, 358/1.15, 442, 1.2; 382/254; 355/40; 399/8
See application file for complete search history.

(56) References Cited

U.S. PATENT DOCUMENTS

| 5,499,108 | A | * | 3/1996 | Cotte et al. | ................. | 358/400 |
|---|---|---|---|---|---|---|
| 5,901,276 | A | * | 5/1999 | Murahashi et al. | ........ | 358/1.13 |
| 5,909,602 | A | * | 6/1999 | Nakai et al. | .................... | 399/8 |
| 5,946,457 | A | * | 8/1999 | Nakai et al. | ............... | 358/1.13 |
| 6,147,770 | A | * | 11/2000 | Unishi et al. | ................ | 358/1.2 |
| 6,278,526 | B1 | * | 8/2001 | Kurozasa | .................... | 358/1.15 |
| 6,323,934 | B1 | * | 11/2001 | Enomoto | ..................... | 355/40 |
| 6,327,056 | B1 | * | 12/2001 | Tsai et al. | ................... | 358/474 |
| 6,388,771 | B1 | * | 5/2002 | Tamaki | ...................... | 358/442 |
| 6,542,260 | B1 | * | 4/2003 | Gann et al. | ................. | 358/471 |
| 6,600,548 | B1 | * | 7/2003 | Enomoto | ..................... | 355/40 |
| 6,628,416 | B1 | * | 9/2003 | Hsu et al. | .................. | 358/1.15 |
| 6,665,096 | B1 | * | 12/2003 | Oh | ............................. | 358/461 |
| 6,665,098 | B1 | * | 12/2003 | Nagarajan | ................... | 358/474 |
| 6,668,096 | B1 | * | 12/2003 | Yamamoto | .................. | 382/254 |
| 6,683,705 | B1 | * | 1/2004 | Yamaguchi | ................. | 358/487 |
| 6,757,081 | B1 | * | 6/2004 | Fan et al. | ................... | 358/474 |
| 6,771,395 | B1 | * | 8/2004 | Kito | .......................... | 358/474 |
| 2001/0050782 | A1 | * | 12/2001 | Niitsuma et al. | .......... | 358/1.15 |

* cited by examiner

*Primary Examiner*—Mark Wallerson
*Assistant Examiner*—Beniyam Menberu
(74) *Attorney, Agent, or Firm*—Rossi, Kimms & McDowell, LLP

(57) ABSTRACT

The present invention relates to an information processing apparatus, an image input apparatus, a method of controlling the information processing apparatus, a method of controlling the image input apparatus, an image input system, and a storage medium storing programs for implementing these methods. According to the present invention, the information processing apparatus executes image processing that can be executed by the image input apparatus, on stored image data from the image input apparatus, based on setting information input according to an operator's instruction. Therefore, a desired input image can be obtained without the need to reenter the image by the image input apparatus, thereby allowing the operator to input images more efficiently.

16 Claims, 10 Drawing Sheets

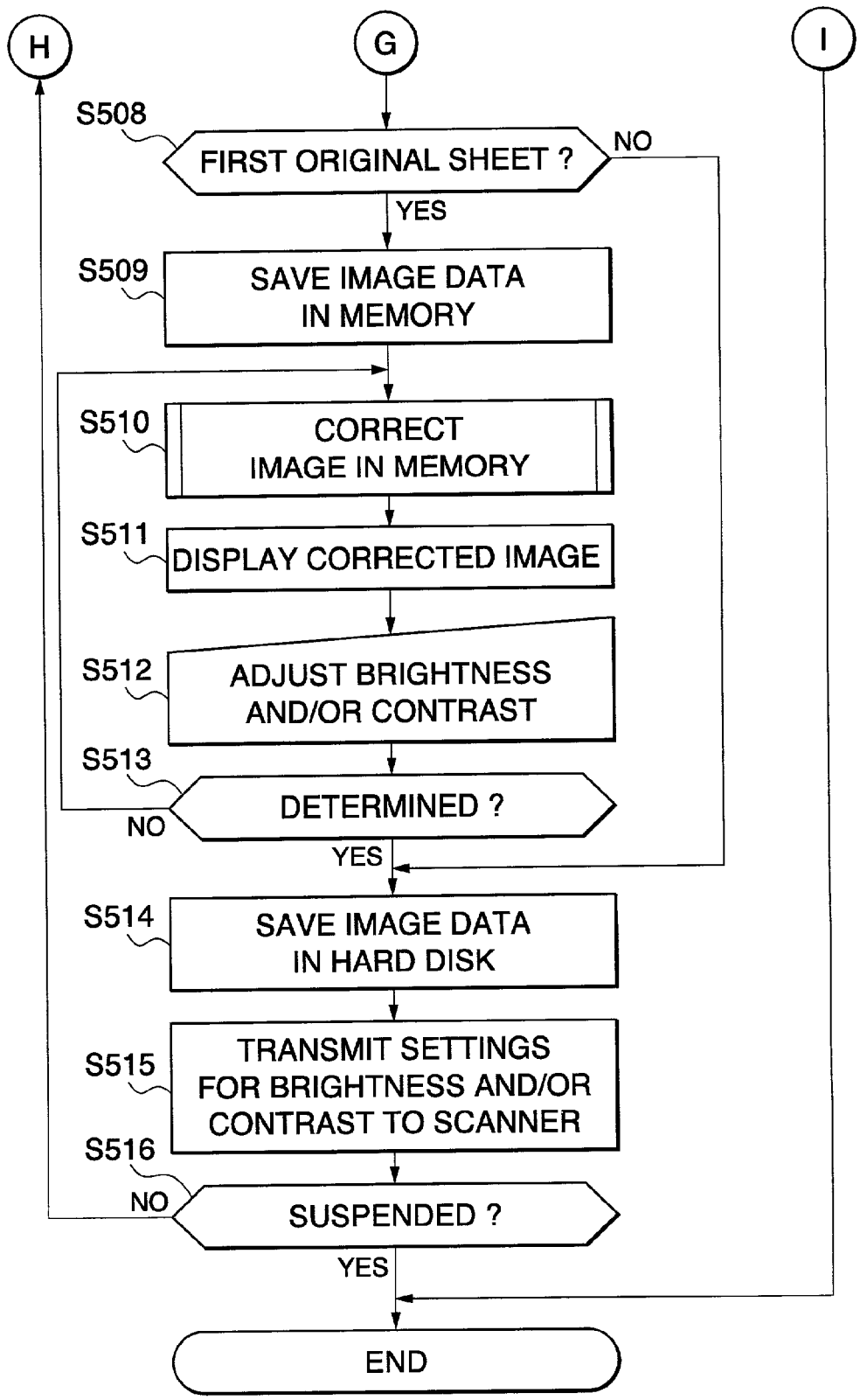

INFORMATION PROCESSING APPARATUS, IMAGE INPUT APPARATUS, METHOD OF CONTROLLING IMAGE PROCESSING APPARATUS, METHOD OF CONTROLLING IMAGE INPUT APPARATUS, IMAGE INPUT SYSTEM, AND STORAGE MEDIUM

BACKGROUND OF THE INVENTION

1. Field of the Invention

The present invention relates to an information processing apparatus which is capable of performing image processing on input image data, an image input apparatus, a method of controlling the image processing apparatus, a method of controlling the image input apparatus, an image input system, and a storage medium storing programs for implementing these methods.

2. Description of the Related Art

An image input system has been proposed, which is comprised of an image input apparatus such as a scanner having an original feeding function of continuously feeding originals, and an information processing apparatus such as a personal computer (PC) connected to the scanner via a cable or the like.

On a scanner side of an image input system of this kind, in general, after a first sheet of a bundle of originals has been fed and image data from that original sheet has then been input by an image input section, an image processing section performs image correction processing on the input image by adjusting the brightness and/or contrast thereof or binarizing the image data.

In this image correcting processing, in a mode for inputting multivalued gray or color images, multivalued image data is input from an original, the input image data is subjected to a gamma correction, which corresponds to a set contrast, and a difference corresponding to a set brightness is added to the multivalued data. On the other hand, in a mode for inputting binary images, multivalued image data is input from an original, the input image data is then transformed into binary data using a slice level corresponding to a set brightness as a boundary without adjusting the contrast and brightness.

The image data thus subjected to the image correction processing on the scanner side is transmitted to a personal computer (PC) side, where the image data is stored in a hard disk as, for example, an image file.

In this image input system, however, the image correcting processing including the brightness and contrast adjustment and binarization is executed only on the scanner side. Thus, if the image data obtained after the image input and corrections does not have a brightness and/or contrast desired by the user, the setting for the brightness and/or contrast has to be changed, and a first sheet of the original bundle has to be set in an original feeding means again to input the image. This operation has to be repeated until the optimal brightness and/or contrast is obtained. Therefore, the conventional image input operation is inefficient.

SUMMARY OF THE INVENTION

It is an object of the present invention to solve the above-mentioned problems by providing an information processing apparatus which is capable of enhancing the efficiency of an image input operation by enabling a desired input image to be obtained without reentering the image by an image input apparatus, as well as a method of controlling the information processing apparatus, an image input system, and a storage medium storing a program for executing the method.

To attain the above object, a first aspect of the present invention provides an information processing apparatus connected to an image input apparatus which is capable of executing predetermined image processing on input image data and outputting the processed image data, the information processing apparatus comprising first storage means for storing image data output from the image input apparatus, instruction input means for inputting setting information for image processing according to an instruction from an operator, and image processing means for executing image processing that can be executed by the image input apparatus, on the image data stored in the first storage means based on the setting information input by the instruction input means.

In a typical embodiment of the first aspect, the image input apparatus is a scanner apparatus having an image processing section that executes predetermined image processing on image data input by reading an image, and the first storage means stores image data transmitted from the scanner apparatus.

The image processing section of the scanner apparatus executes image processing related to image correction, and the image processing means executes image correction that can be executed by the image processing section of the scanner apparatus.

The image correction includes processes related to contrast adjustment, brightness adjustment, and binarization of an image.

The scanner apparatus further includes an image input section that feeds an original and inputs image data by reading an image from the fed original.

The information processing apparatus according to the first aspect further comprises display means for displaying the image data processed by the image processing means.

Preferably, the image processing means executes image processing on image data temporarily stored in the storage means and the display means displays the processed image data, before the instruction input means inputs set values.

More preferably, the information processing apparatus according to the first aspect further comprises second storage means for storing the processed image data after the image processing means has executed image processing based on the setting information.

Preferably, the information processing apparatus according to the first aspect further comprises third storage means for storing setting information input by the instruction input means, and the image processing means executes image processing on second and subsequent image data output from the image input apparatus based on the setting information stored in the third storage means.

Preferably, the information processing apparatus according to the first aspect further comprises selecting means for selecting either a first mode in which the image input apparatus executes the image processing or a second mode in which the information processing apparatus executes the image processing, according to an instruction input by the operator.

In a typical application of the present invention, the image input apparatus is a scanner apparatus, and the information processing apparatus is a personal computer connected to the scanner apparatus via a communication cable.

Preferably, the information processing apparatus according to the first aspect further comprises transmitting means for transmitting the setting information used for the image processing by the image processing means, to the image input apparatus.

In a preferred embodiment of the first aspect, the transmitting means transmits the setting information to the image input apparatus after first image data stored in the first storage means has been processed by the image processing means.

Preferably, the information processing apparatus according to the first aspect further comprises display means for displaying the image data processed by the image processing means.

More preferably, the image input apparatus is a scanner apparatus having an image processing section that executes predetermined image processing on image data input by reading an image, and the first storage means stores image data transmitted from the scanner apparatus.

Further preferably, the image processing section of the scanner apparatus executes image processing related to image correction based on the setting information transmitted from the transmitting means, and the image processing means executes image correction that can be executed by the image processing section of the scanner apparatus.

To attain the above object, the first aspect of the present invention also provides a method of controlling an information processing apparatus connected to an image input apparatus which is capable of executing predetermined image processing on input image data and outputting the processed image data, the method comprising a first storing step of storing image data output from the image input apparatus, in a storage section, an instruction input step of inputting setting information for image processing according to an instruction from an operator, and an image processing step of executing image processing that can be executed by the image input apparatus, on the image data stored in the storage section based on the setting information input in the instruction input step.

To attain the above object, the first aspect of the present invention further provides a computer-readable storage medium storing a program code for implementing a method of controlling an information processing apparatus connected to an image input apparatus which is capable of executing predetermined image processing on input image data and outputting the processed image data, the program code comprising a storing module for storing image data output from the image input apparatus, in a storage section, an instruction input module for inputting setting information for image processing according to an instruction from an operator, and an image processing module for executing image processing that can be executed by the image input apparatus, on the image data stored in the storage means based on the setting information input by the instruction input module.

It is another object of the present invention to provide an information processing apparatus which is capable of enhancing the efficiency of an image input operation by enabling a desired input image to be obtained without reentering the image by a scanner apparatus two or more times, as well as a method of controlling the information processing apparatus, and a storage medium storing a program for executing the method.

To attain the above object, a second aspect of the present invention provides an information processing apparatus connected via a communication cable to a scanner apparatus, the scanner apparatus comprising an image input section that feeds an original and inputs image data by reading an image from the fed original, and an image correcting section that executes predetermined image correction on the image data input by the image input section, the scanner apparatus being capable of transmitting the image data corrected by the image correcting section, the information processing apparatus comprising first storage means for storing image data transmitted from the scanner apparatus, first image correcting means for executing image correction that can be executed by the scanner apparatus, on the image data stored in the first storage means, display means for displaying the corrected image data, instruction input means for inputting setting information for image correction according to an instruction from an operator, second image correcting means for executing image correction that can be executed by the scanner apparatus, on the image data stored in the first storage means based on the setting information input by the instruction input means, and second storage means for storing the image data corrected by the second image correcting means.

To attain the above object, the second aspect of the present invention also provides a method of controlling an information processing apparatus connected via a communication cable to a scanner apparatus, the scanner apparatus comprising an image input section that feeds an original and inputs image data by reading an image from the fed original, and an image correcting section that executes predetermined image correction on the image data input by the image input section, the scanner apparatus being capable of transmitting the image data corrected by the image correcting section, the method comprising a first storing step of storing image data transmitted from the scanner apparatus, in a storage section, a first image correcting step of executing image correction that can be executed by the scanner apparatus, on the image data stored in the first storing step, a display step of displaying the corrected image data, an instruction input step of inputting setting information for image correction according to an instruction from an operator, a second image correcting step of executing image correction that can be executed by the scanner apparatus, on the image data stored in the first storing step based on the setting information input in the instruction input step, and a second storing step of storing the image data corrected in the second image correcting step, in a storage section.

It is still another object of the present invention to provide an information processing apparatus which is capable of enhancing the efficiency of an image input operation by enabling a desired input image to be obtained without reentering the image by a scanner apparatus two or more times, and by reducing the time and labor for carrying out setting operations by an operator, as well as a method of controlling the information processing apparatus, and a storage medium storing a program for executing this method.

To attain the above object, a third aspect of the present invention provides an information processing apparatus connected via a communication cable to a scanner apparatus, the scanner apparatus comprising an image input section that feeds an original and inputs image data by reading an image from the fed original, and an image correcting section that executes predetermined image processing on the image data input by the image input section, the scanner apparatus being capable of transmitting the image data corrected by the image correcting section, the information processing apparatus comprising first storage means for storing image data on a first original sheet transmitted from the scanner apparatus, first image correcting means for executing image correction that can be executed by the scanner apparatus, on the image data stored in the first storage means, display means for displaying the corrected image data, instruction input means for inputting setting information for image correction according to an instruction from an operator, second image correcting means for executing image correction that can be executed by the scanner apparatus, on the image data stored in the first storage means based on the setting information input by the instruction input means, second storage means for storing the image data corrected by the second image correcting means, third storage means for storing the setting information input by the instruction input means, fourth storage means for storing image data on second and subsequent original sheets transmitted from the scanner apparatus, in response to storing of the image data on the first original sheet in the second storage means, third image correcting means for executing image correction that can be executed by the scanner apparatus, on the image data stored in the fourth storage means based on the setting information stored in the third storage means, and fifth storage means for storing the image data corrected by the third image correcting means.

To attain the above object, the third aspect of the present invention also provides a method of controlling an information processing apparatus connected via a communication cable to a scanner apparatus the scanner apparatus comprising an image input section that feeds an original and inputs image data by reading an image from the fed original, and an image correcting section that executes predetermined image processing on the image data input by the image input section, the scanner apparatus being capable of transmitting the image data corrected by the image correcting section, the method comprising a first storing step of storing image data on a first original sheet transmitted from the scanner apparatus, in a storage section, a first image correcting step of executing image correction that can be executed by the scanner apparatus, on the image data stored in the first storing step, a display step of displaying the corrected image data, an instruction input step of inputting setting information for image correction according to an instruction from an operator, a second image correcting step of executing image correction that can be executed by the scanner apparatus, on the image data stored in the first storing step based on the setting information input in the instruction input step, a second storing step of storing the image data corrected in the second image correcting step, in a storage section, a third storing step of storing the setting information input in the instruction input step, in a storage section, a fourth storing step of storing image data on second and subsequent original sheets transmitted from the scanner apparatus in a storage section, in response to storing of the image data on the first original sheet in the second storing step, a third image correcting step of executing image correction that can be executed by the scanner apparatus, on the image data stored in the fourth storing step based on the setting information stored in the third storing step, and a fifth storing step of storing the image data corrected in the third image correcting step, in a storage section.

It is a further object of the present invention to provide an information processing apparatus which is capable of enhancing the efficiency of an image input operation and further improving an image input processing speed, by enabling a desired input image to be obtained without reentering the image by a scanner apparatus two or more times, and by reducing the time and labor for carrying out setting operations by an operator, as well as a method of controlling the information processing apparatus, and a storage medium storing a program for executing the method.

To attain the above object, a fourth aspect of the present invention provides an information processing apparatus connected via a communication cable to a scanner apparatus, the scanner apparatus comprising an image input section that feeds an original and inputs image data by reading an image from the fed original, and an image correcting section that executes predetermined image processing on the image data input by the image input section, the scanner apparatus being capable of transmitting the image data corrected by the image correcting section, the information processing apparatus comprising first storage means for storing image data on a first original sheet transmitted from the scanner apparatus, first image correcting means for executing image correction that can be executed by the scanner apparatus, on the image data stored in the first storage means, display means for displaying the corrected image data, instruction input means for inputting setting information for image correction according to an instruction from an operator, second image correcting means for executing image correction that can be executed by the scanner apparatus, on the image data stored in the first storage means based on the setting information input by the instruction input means, second storage means for storing the image data corrected by the second image correcting means, transmitting means for transmitting the setting information input by the instruction input means, to the scanner apparatus, and third storage means for storing image data on second and subsequent original sheets which have been transmitted from the scanner apparatus after being corrected based on the setting information by the image correcting section of the scanner apparatus.

To attain the above object, the fourth aspect of the present invention also provides a method of controlling an information processing apparatus connected via a communication cable to a scanner apparatus, the scanner apparatus comprising an image input section that feeds an original and inputs image data by reading an image from the fed original, and an image correcting section that executes predetermined image processing on the image data input by the image input section, the scanner apparatus being capable of transmitting the image data corrected by the image correcting section, the method comprising a first storing step of storing image data on a first original sheet transmitted from the scanner apparatus, in a storage section, a first image correcting step of executing image correction that can be executed by the scanner apparatus, on the image data stored in the first storing step, a display step of displaying the corrected image data, an instruction input step of inputting setting information for image correction according to an instruction from an operator, a second image correcting step of executing image correction that can be executed by the scanner apparatus, on the image data stored in the first storing step based on the setting information input in the instruction input step, a second storing step of storing the image data corrected in the second image correcting step, in a storage section, a transmitting step of transmitting the setting information input in the instruction input step, to the scanner apparatus, and a third storing step of storing, in a storage section, image data on second and subsequent original sheets which have been transmitted from the scanner apparatus after being corrected based on the setting information by the image correcting section of the scanner apparatus.

It is a still further object of the present invention to provide an information processing apparatus which allows an operator to determine whether an image input apparatus or the information processing apparatus is to execute image processing on the input image, depending on the operator's needs, as well as a method of controlling the information processing apparatus.

To attain the above object, a fifth aspect of the present invention provides an information processing apparatus connected to an image input apparatus which is capable of executing predetermined image processing on input image data and outputting the processed image data, the information processing apparatus comprising selecting means for selecting either a first mode in which the image input apparatus executes image processing or a second mode in which the image processing apparatus executes image processing, according to an instruction input by an operator, storage means for storing image data output from the image input apparatus, instruction input means for inputting setting information for image processing according to an instruction from an operator, and image processing means for executing image processing on the image data stored in the storage means based on the setting information input by the instruction input means, if the selecting means selects the second mode.

To attain the above object, the fifth aspect of the present invention also provides a method of controlling an information processing apparatus connected to an image input apparatus which is capable of executing predetermined image processing on input image data and outputting the processed image data, the method comprising a selecting step of selecting either a first mode in which the image input apparatus executes image processing or a second mode in which the image processing apparatus executes image processing, according to an instruction input by an operator, a storing step of storing image data output from the image input apparatus, in a storage section, an instruction input step of inputting setting information for image processing according to an instruction from an operator, and an image processing step of executing image processing on the image data stored in the storing step based on the setting information input in the instruction input step, if the second mode is selected in the selecting step.

It is another object of the present invention to provide an information processing apparatus which is capable of enhancing the speed of image processing on the input image, as well as a method of controlling the information processing apparatus.

To attain the above object, a sixth aspect of the present invention provides an information processing apparatus connected to an image input apparatus which is capable of executing predetermined image processing on input image data and outputting the processed image data, the information processing apparatus comprising storage means for storing image data output from the image input apparatus, instruction input means for inputting setting information for image processing according to an instruction from an operator, image processing means for executing image processing on the image data stored in the storage means based on the setting information input by the instruction input means, and transmitting means for transmitting the setting information used for the image processing by the image processing means, to the image input apparatus.

To attain the above object, the sixth aspect of the present invention also provides a method of controlling an information processing apparatus connected to an image input apparatus which is capable of executing predetermined image processing on input image data and outputting the processed image data, the method comprising a storing step of storing image data output from the image input apparatus, in a storage section, an instruction input step of inputting setting information for image processing according to an instruction from an operator, an image processing step of executing image processing on the image data stored in the storing step based on the setting information input in the instruction input step, and a transmitting step of transmitting the setting information used for the image processing in the image processing step, to the image input apparatus.

It is still another object of the present invention to provide an image input apparatus which is capable of enhancing the efficiency of an image input operation by enabling a desired input image to be obtained without reentering the image by the image input apparatus, as well as a method of controlling the image input apparatus, an image input system, and a storage medium storing a program for executing the method.

To attain the above object, a seventh aspect of the present invention provides an image input apparatus connected to an information processing apparatus which is capable of executing predetermined image processing on input image data and storing the processed image data, the image input apparatus comprising input means for inputting image data, and image processing means for executing image processing that can be executed by the image processing apparatus, on the image data input by the input means, and the image processing means executes image processing on the image data input by the input means, depending on contents of image processing executed by the image processing apparatus.

Preferably, the information processing apparatus executes image processing on the image data based on setting information input by an operator, and the image processing means executes image processing on the image data input by the input means, based on the setting information transmitted from the image processing apparatus.

In a preferred embodiment of the seventh aspect, the image input apparatus further comprises determining means for determining whether the image data input by the input means is from a first original sheet, and if the determining means determines that the image data is from the first original sheet, the image processing means does not execute image processing on the image data input by the input means, and if the determining means determines that the image data is not from the first original sheet, the image processing means executes image processing on the image data input by the input means.

In a typical embodiment, the image input apparatus is a scanner apparatus, and the input means inputs image data by reading an image.

Preferably, the image processing means executes image processing related to image correction, and the image processing apparatus executes image correction that can be executed by the image processing means.

Typically, the image correction includes processing related to contrast adjustment, brightness adjustment, and binarization of an image.

In a preferred embodiment, the input means inputs image data by reading an image, and if the determining means determines that the image data is not from the first original sheet, the input means inputs image data by continuously reading second and subsequent original sheets, and the image processing means executes image processing on the image data input by the input means.

Preferably, the image input apparatus is a scanner apparatus, and the image processing apparatus is a personal computer connected to the scanner apparatus via a communication cable.

To attain the above object, the seventh aspect of the present invention also provides a method of controlling an image input apparatus connected to an information processing apparatus which is capable of executing predetermined image processing on input image data and storing the processed image data, the method comprising an input step of inputting image data, an image processing step of executing image processing that can be executed by the image processing apparatus, on the image data input in the input step, and the image processing step comprises executing image processing on the image data input in the input step, depending on contents of image processing executed by the image processing apparatus.

To attain the above object, the seventh aspect of the present invention further provides a computer-readable storage medium storing a program code for implementing a method of controlling an image input apparatus connected to an information processing apparatus which is capable of executing predetermined image processing on input image data and storing the processed image data, the program code comprising an input module for inputting image data, and an image processing module for executing image processing that can be executed by the image processing apparatus, on the image data input by the input module, and the image processing module executes image processing on the image data input by the input module, depending on contents of image processing executed by the image processing apparatus.

It is a further object of the present invention to provide a scanner apparatus which is capable of enhancing the efficiency of an image input operation and further improving an image input processing speed, by enabling a desired input image to be obtained without reentering the image by the scanner apparatus two or more times, and by reducing the time and labor for carrying out setting operations by an operator, as well as a method of controlling the scanner apparatus, and a storage medium storing a program for executing the method.

To attain the above object, an eighth aspect of the present invention provides a scanner apparatus connected to an image processing apparatus which is capable of executing predetermined image correction on input image data based on setting information input by an operator and storing the corrected image data, the scanner apparatus comprising input means for feeding an original and inputting image data by reading an image from the fed original, image processing means for executing image correction that can be executed by the image processing apparatus, on the image data input by the input means, and determining means for determining whether the image data input by the input means is from a first original sheet, and if the determining means determines that the image data is not from the first original sheet, the image processing-means executes image processing on the image data input by the input means, based on the setting information transmitted from the image processing apparatus.

To attain the above object, the eighth aspect of the present invention also provides a method of controlling a scanner apparatus connected to an image processing apparatus which is capable of executing predetermined image correction on input image data based on setting information input by an operator and storing the corrected image data, the method comprising an input step of feeding an original and inputting image data by reading an image from the fed original, an image processing step of applying image correction that can be executed by the image processing apparatus, on the image data input in the input step, and a determining step of determining whether the image data input in the input step is from a first original sheet, and if it is determined in the determining step that the image data is not from the first original sheet, the image processing step executes image processing on the image data input in the input step, based on the setting information transmitted from the image processing apparatus.

It is another object of the present invention to provide an image input apparatus which allows the operator to determine whether the image input apparatus or an information processing apparatus is to execute image processing on the input image, depending on the operator's needs, as well as a method of controlling the image input apparatus.

To attain the above object, a ninth aspect of the present invention provides an image input apparatus connected to an information processing apparatus which is capable of executing predetermined image processing on input image data and storing the processed image data, the image input apparatus comprising input means for inputting image data, image processing means for executing image processing on the image data input by the input means, and if the image processing apparatus is to execute image processing on the image data input by the input means, the image processing means does not execute image processing on the image data input by the input means.

To attain the above object, the ninth aspect of the present invention also provides a method of controlling an image input apparatus connected to an information processing apparatus which is capable of executing predetermined image processing on input image data and storing the processed image data, the method comprising an input step of inputting image data, an image processing step of executing image processing on the image data input in the input step, and if the image processing apparatus is to execute image processing on the image data input in the input step, image processing on the image data input in the input step is not executed in the image processing step.

Further, to attain one or more of the above objects, the present invention provides an image input system including an image input apparatus which is capable of executing predetermined image processing on input image data and outputting the processed image data, and an image processing apparatus connected to the image input apparatus, wherein the image input apparatus comprises input means for inputting image data, and first image processing means for executing image processing on the image data input by the input means, wherein the information processing apparatus comprises storage means for storing image data output from the image input apparatus, instruction input means for inputting setting information for image processing according to an instruction from an operator, and second image processing means for executing image processing that can be executed by the first image processing means, on the image data stored in the storage means based on the setting information input by the instruction input means, and wherein the first image processing means executes image processing on the image data input by the input means, depending on contents of image processing executed by the second image processing means.

Further, to attain one or more of the above objects, the present invention provides an image input system including a scanner apparatus comprising an image input section that feeds an original and inputs image data by reading an image from the fed original, and an image correcting section that executes predetermined image processing on the image data input by the image input section, the scanner apparatus being capable of transmitting the image data corrected by the image correcting section, to an external apparatus, and an image processing apparatus connected to the scanner apparatus via a communication cable, wherein the scanner apparatus comprises input means for feeding an original and inputting image data by reading an image from the fed original, first image correcting means for executing image correction on the image data input by the input means, and determining means for determining whether the image data input by the input means is from a first original sheet, wherein the information processing apparatus comprises first storage means for storing image data transmitted from the scanner apparatus, second image correcting means for executing image correction that can executed by the first image correcting means, on the image data stored in the first storage means, display means for displaying the corrected image data, instruction input means for inputting setting information for the image correction according to an instruction from an operator, third image correcting means for executing image correction that can be executed by the first image correcting means, on the image data stored in the first storage means based on the setting information input by the instruction input means, and second storage means for storing the image data corrected by the third image correcting means, and wherein if the determining means determines that the image data is not from a first original sheet, the first image correcting means executes image correction on the image data input by the input means, based on the setting information transmitted from the information processing apparatus.

The above and other objects, features, and advantages of the present invention will become more apparent from the following detailed description taken in conjunction with the accompanying drawings.

BRIEF DESCRIPTION OF THE DRAWINGS

FIG. 12 is a continued part of the flow chart of FIG. 11.

DETAILED DESCRIPTION OF THE PREFERRED EMBODIMENTS

The present invention will be described below with reference to the drawings showing preferred embodiments thereof.

First Embodiment

Figure 1:
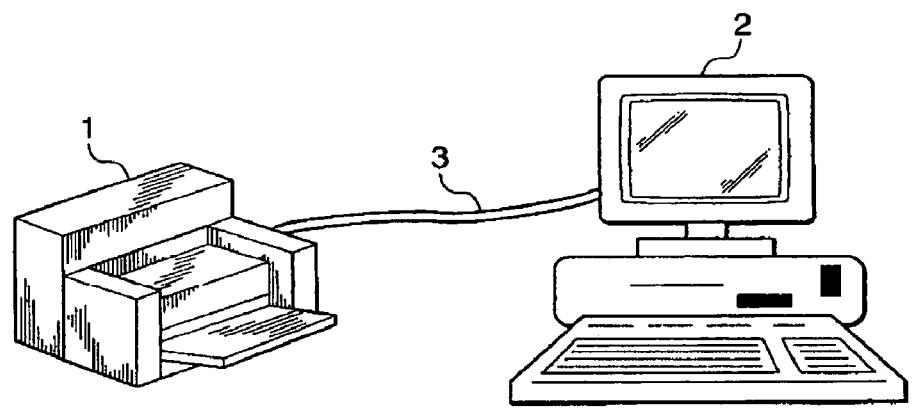
FIG. 1 is a schematic view of an image input system according to a first embodiment of the present invention.

FIG. 1 is a schematic view of an image input system according to a first embodiment of the present invention.

The image input system is comprised of a scanner 1 for executing the input of image data and the like, and a personal computer (PC) 2 for displaying and saving the image data. The scanner 1 and the PC 2 are connected together via a cable 3. The cable 3 functions as both means for transmitting the image data from the scanner 1 to the PC 2 and means for transmitting image correction settings from the PC 2 to the scanner.

Figure 2:
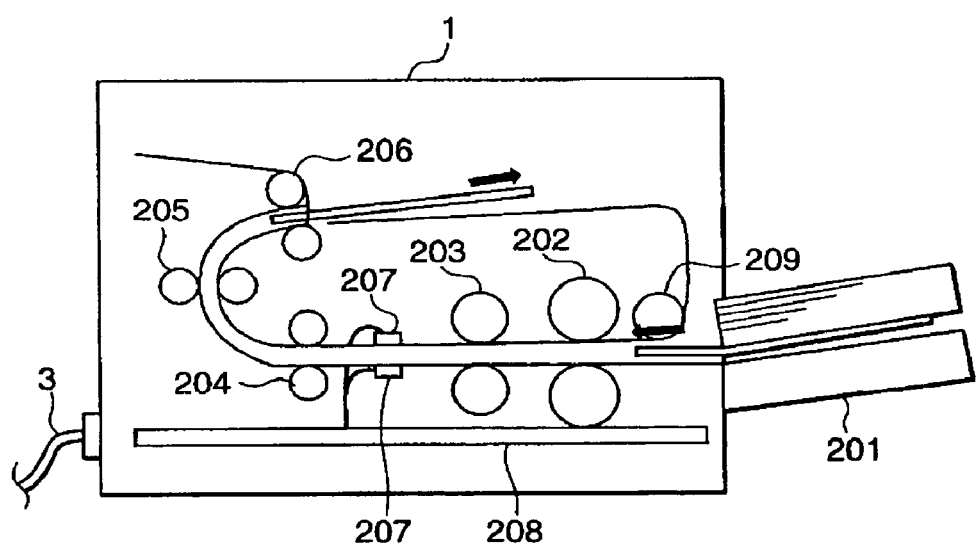
FIG. 2 is a sectional view schematically showing the structure of a scanner 1 shown in FIG. 1.

FIG. 2 is a sectional view schematically showing the structure of the scanner 1, shown in FIG. 1.

The scanner 1 is comprised of an original tray 201 in which a bundle of originals are set, motors 202 to 206 for continuously feeding the originals to the original tray 201, a sensor 207 for inputting multivalued gray or color image data from the originals, a CPU 208 for executing calculations related to image corrections such as brightness and contrast adjustment and binarization, and a sensor 209 for detecting whether or not any original is set in the original tray 201.

Figure 3:
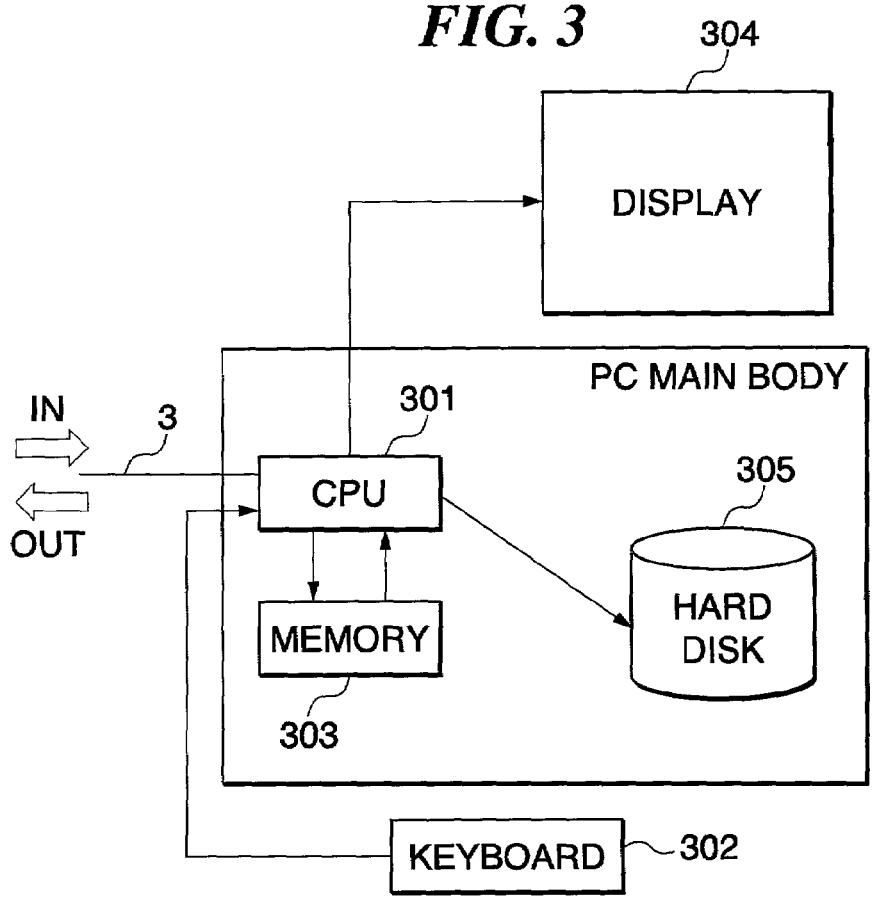
FIG. 3 is a functional block diagram schematically showing the constitution of a personal computer (PC) 2 shown in FIG. 1.

FIG. 3 is a functional block diagram schematically showing the constitution of the PC 2 shown in FIG. 1.

The PC 2 includes a CPU 301 for executing calculations related to the image corrections such as the brightness and contrast adjustment and the binarization, saving image data, and for controlling the scanner 1. The PC 2 also includes a keyboard 302 which is operated by a user to instruct image input to be started or terminated, to determine whether the image corrections are to be executed by the scanner 1 or the PC 2, or to set the image corrections such as the brightness and contrast adjustment and the binarization. The PC 2 also includes a memory 303 that stores images transmitted from the scanner 1 as well as settings for the image corrections, a display 304 for displaying image data as images, and a hard disk 305 that saves the image data.

Here, the image corrections executed by the CPU 301 are equivalent to those executed by the CPU 208. That is, the CPU 301 can execute the image corrections that can be executed by the CPU 208, on image data, whereas the CPU 208 can execute the image corrections that can be executed by the CPU 301, on image data. In the present embodiment, the image corrections will be described on the assumption that the CPUs 301 and 208 can each execute the contrast and brightness adjustment and the binarization process.

Further, a mouse, a touch panel, or the like may be used instead of the keyboard 302 to input settings. A floppy disk or a CD-R may be used instead of the hard disk 305.

Figure 4:
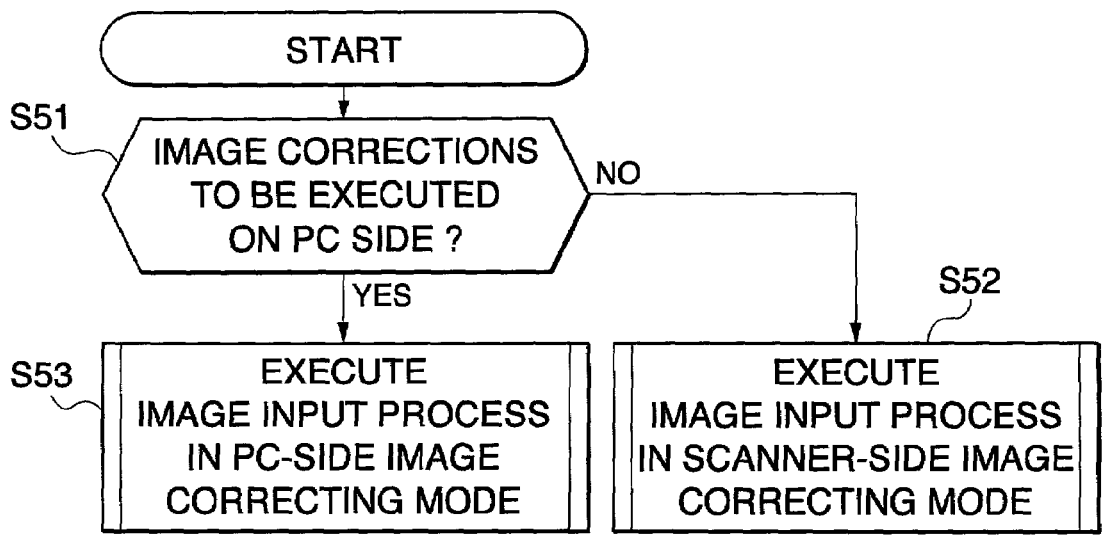
FIG. 4 is a flow chart showing an image correction selecting process.

FIG. 4 is a flow chart showing an image correction selecting process.

Figure 5:
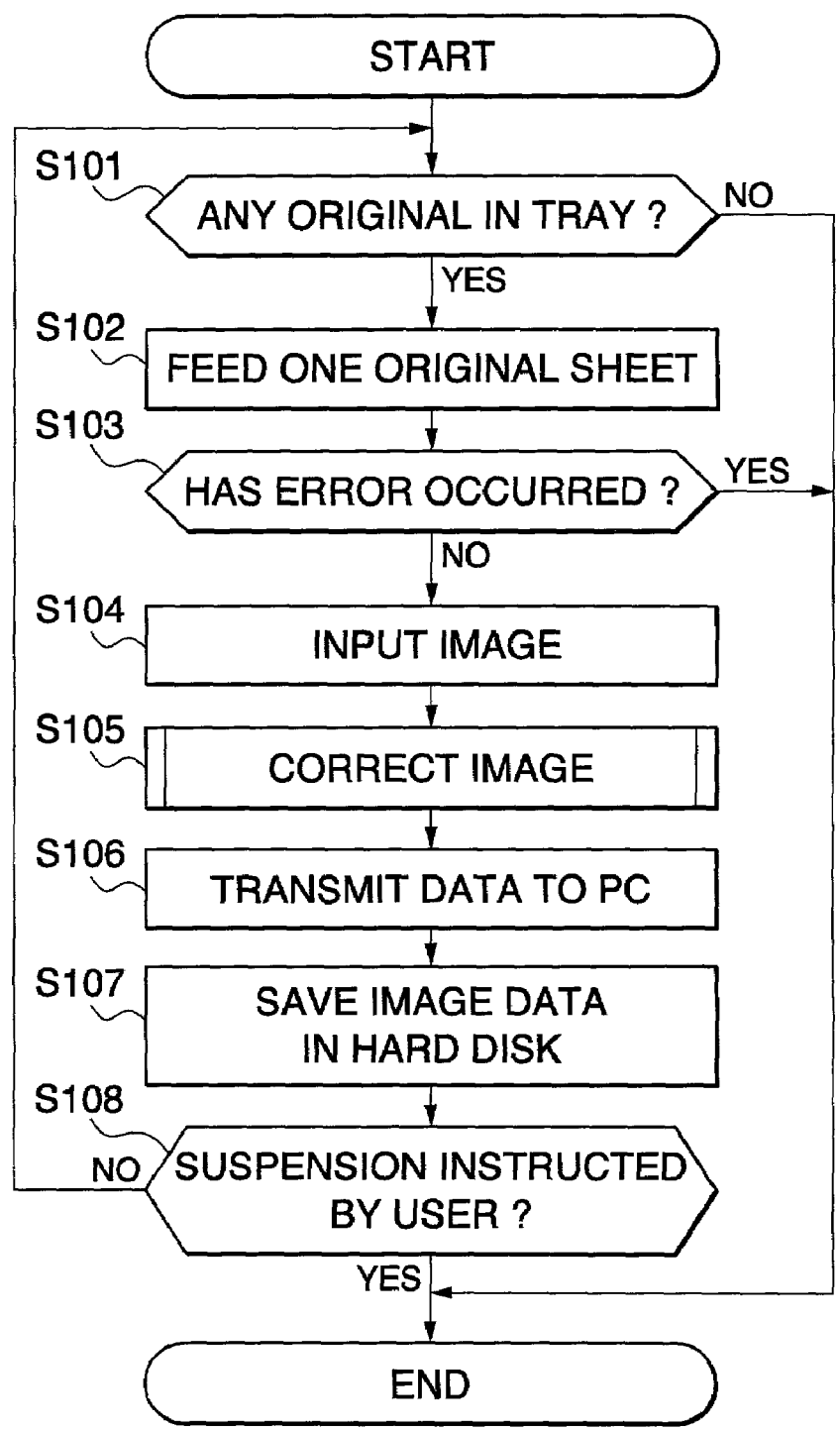
FIG. 5 is a flow chart showing an image input process in a scanner-side image correcting mode.
Figure 7:
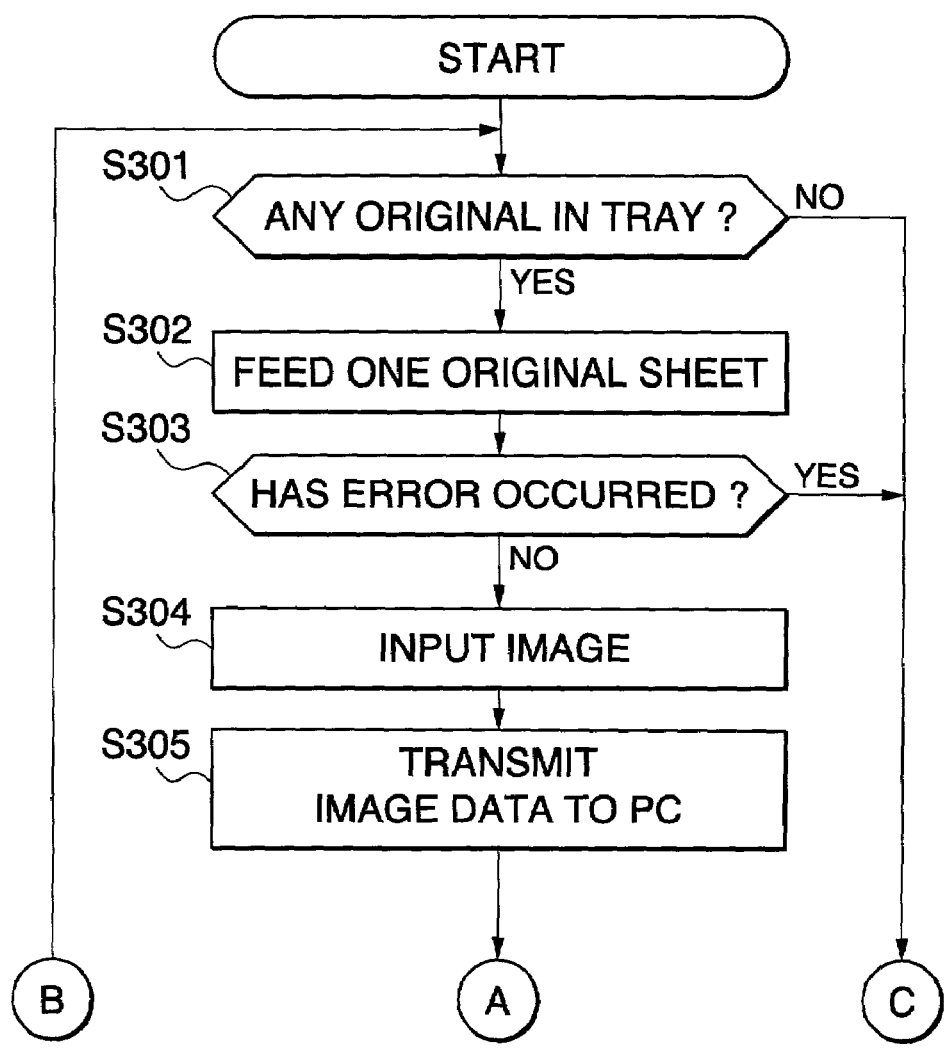
FIG. 7 is a flow chart showing the operation of the image input system according to the first embodiment.
Figure 8:
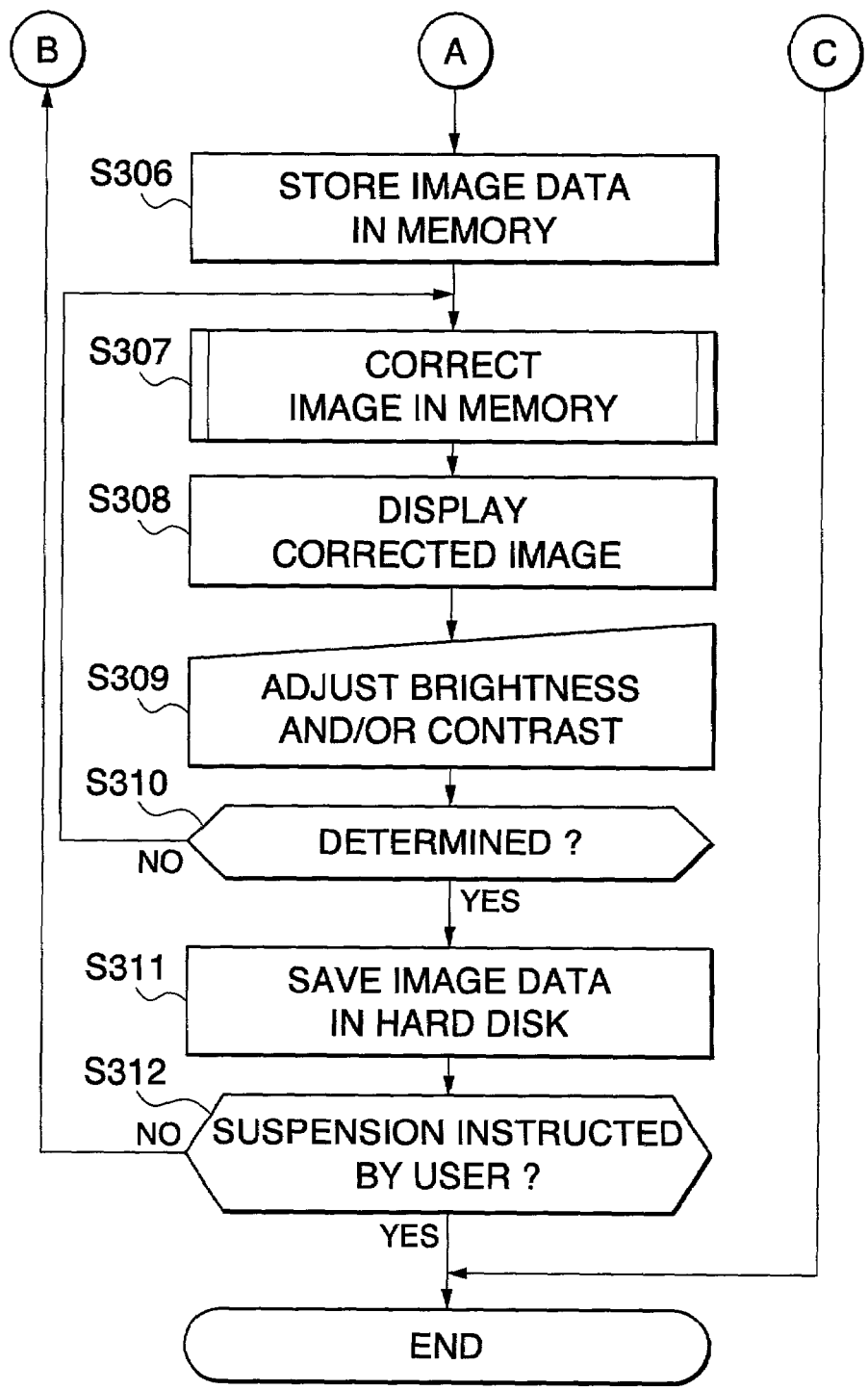
FIG. 8 is a continued part of the flow chart of FIG. 7.

A user operates the keyboard 302 to select the scanner 1 or the PC 2 to be used for executing the image corrections (step S51). If the image corrections are to be executed by the scanner 1, an image input process in a scanner-side image correcting mode as shown in FIG. 5, described later, is executed (step S52). If the image corrections are to be executed by the PC 2, an image input process in a PC-side image correcting mode as shown in FIGS. 7 and 8, described later, is executed (step S53).

First, an operation performed if the user determines that the image corrections are to be executed by the scanner 1 (the image input process in the scanner-side image correcting mode) will be described with reference to the flow chart in FIG. 5.

In the scanner 1, the sensor 209 detects whether or not any original is set in the tray (step S1O1). If any original is set therein, the motors 202 to 206 feed a first sheet of a bundle of originals to the original tray 201 (step S102). At this time, if no original is set in the original tray 201 (step S101) or an error such as a jam occurs while the original is being fed (step S103), the process is terminated.

Then, the sensor 207 inputs an image from the original as image data (step S104), and the image is subjected to the image correction such as the brightness and contrast adjustment or the binarization (step S105) and the image thus subjected to the image correction is fed to the PC 2 through the cable 3 (step S106). The PC 2 saves the image transmitted from the scanner 1 in the hard disk (step S107).

In the same manner as the first original sheet, second and subsequent original sheets are fed by the motors 202 to 206 of the scanner 1, and images from these original sheets are input by the sensor 207, subjected to the image correction, and then transmitted to the PC 2. In the PC 2, the images transmitted from the scanner 1 are saved in the hard disk 305.

The above operations are repeated until there is no original set in the original tray 201 (step S101), the process is terminated due to an error (step S103), or the user inputs a command to suspend the image input, through the keyboard 302 (step S108).

Figure 6:
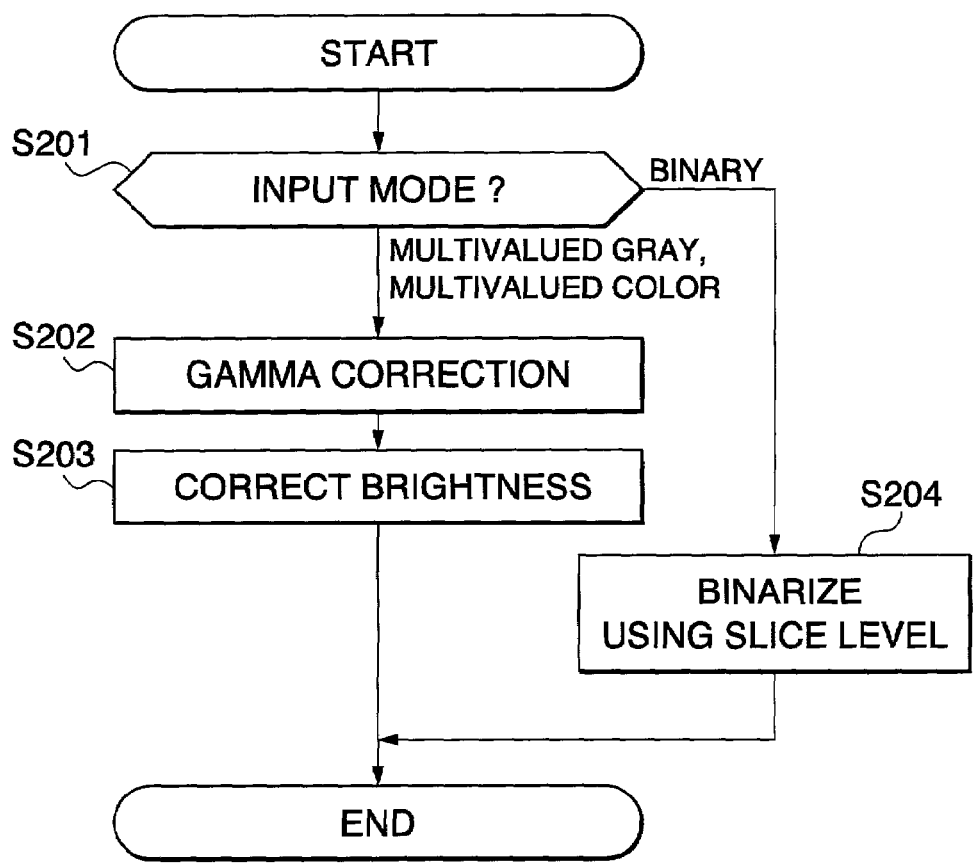
FIG. 6 is a flow chart showing an image correcting process (step S105) shown in FIG. 5.

FIG. 6 is a flow chart showing an image correcting process (step S105) shown in FIG. 5.

First, the input mode of the image data is determined (step S201). If the mode is for inputting multivalued gray or color images, then image data input as multivalued gray or color image data are subjected to a gamma correction corresponding to a set contrast (step S202), and a difference corresponding to a set brightness (step S203) is added to the multivalued image data.

On the other hand, if the mode is for inputting binary images (step S201), image data input as multivalued gray image data are transformed into binary data using a slice level corresponding the designated brightness as a boundary (step S204).

Next, an operation performed if the user determines that the image corrections are to be executed by the PC 2 (the image input process in the PC-side image correcting mode) will be described with reference to the flow chart in FIGS. 7 and 8. FIG. 7 shows an operation on the scanner side, and FIG. 8 shows an operation on the PC side.

In the scanner 1, the sensor 209 detects whether or not any original is set in the tray (step S301). If any original is set therein, the motors 202 to 206 feed a first original sheet (step S302). If a feeding error occurs (step S303), the process is terminated. Otherwise, the sensor 207 inputs image data from the original (step S304), and the input image data is then transmitted to the PC 2 without being subjected to the above described image correction (such as the brightness and/or contrast adjustment or the binarization) (step S305).

In the PC 2, first, the image transmitted from the scanner 1 is stored in the memory 303 (step S306). Subsequently, the image data in the memory is subjected to the image correction (step S307), and the corrected image data is displayed on the display 304 as an image (step S308).

At this time, the image corrections executed by the CPU 301 of the PC 2 are equivalent to those executed by the CPU 208 of the scanner 1, as described above. That is, as shown in the flow chart in FIG. 6, in the mode for inputting multivalued gray or color images, a gamma correction corresponding to the set contrast is executed, and a difference corresponding to the set brightness is added to the multivalued image data. Further, in the mode for inputting binary images, the image data is transformed into binary data using a slice level corresponding to the designated brightness as a boundary without having the contrast and brightness thereof adjusted.

When the user inputs a command to adjust the brightness and/or contrast, through the keyboard 302 (step S309), operations are repeated, which comprise subjecting the image stored in the memory 303 to the image correction again and displaying the corrected image on the display 304. After these operations have been repeated until the brightness and/or contrast becomes optimal, when the user inputs a command to determine the brightness and/or contrast, through the keyboard 302 (step S310), the corrected image data is saved in the hard disk 305 as a first image (step S311).

In the same manner as the first original sheet, second and subsequent original sheets are fed by the motors 202 to 206 of the scanner 1, and the images input by the sensor 207 are transmitted to the PC 2 without being subjected to the image correction. When the user then adjusts the brightness and/or contrast on the PC 2 and inputs a command to determine the brightness and/or contrast, the corrected image data is saved in the hard disk 305 as second and subsequent images.

The above operations are repeated until there is no original set in the original tray 201 (step S301), the process is terminated due to an error (step S303), or the user inputs a command to suspend the image input, through the keyboard 302 (step S312).

As described above, according to the present embodiment, the image data can be subjected to the image correction for parameters such as brightness and contrast as desired by the user, without the need to input the image from each original set in the original tray 201, two or more times.

Second Embodiment

In the second embodiment, if the user determines that the image corrections are to be executed by the PC 2, the user adjusts an image in a first original sheet but not images in second and subsequent original sheets.

Figure 9:
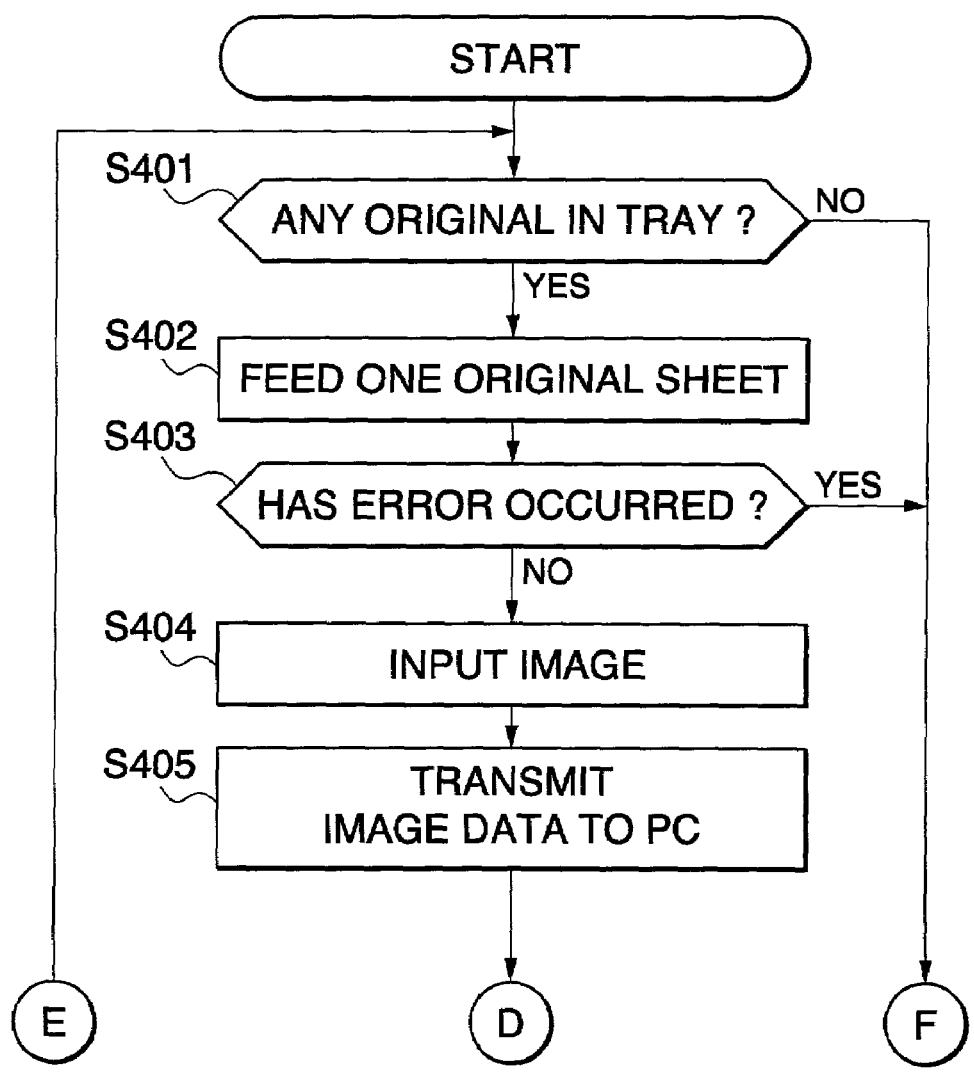
FIG. 9 is a flow chart showing the operation of an image input system according to a second embodiment of the present invention.
Figure 10:
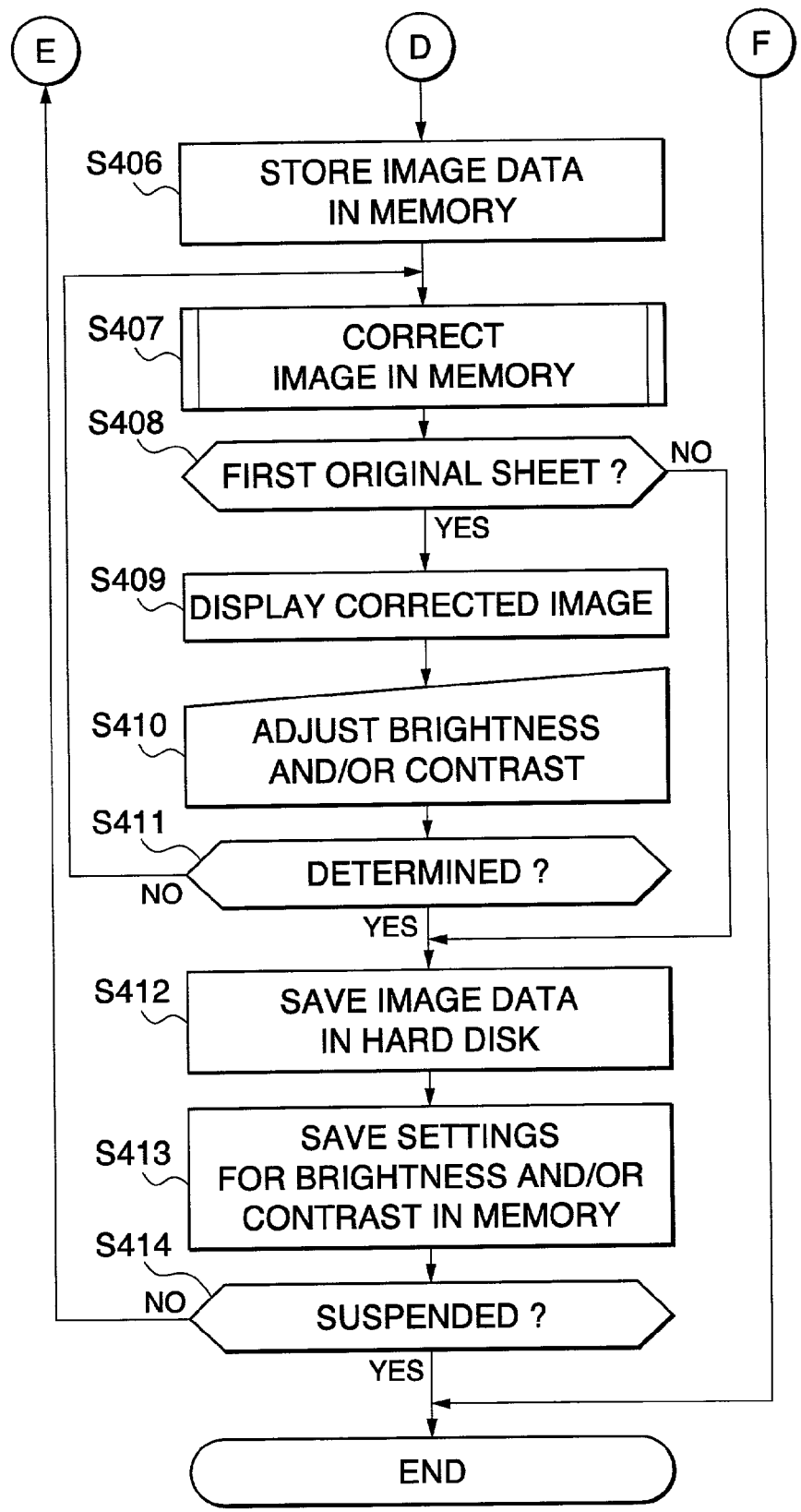
FIG. 10 is a continued part of the flow chart of FIG. 9.

FIGS. 9 and 10 are a flow chart showing the operation of an image input system according to the second embodiment of the present invention.

In the scanner 1, the sensor 209 detects whether or not any original is set in the tray (step S401). If any original is set therein, the motors 202 to 206 of the scanner 1 feed a first original sheet (step S402). If a feeding error occurs (step S403), the process is terminated. Otherwise, when the sensor 207 inputs image data from the first original sheet (step S404), the input image data is transmitted to the PC 2 without being subjected to the image correction (step 5405).

In the PC 2, first, the image transmitted from the scanner 1 is stored in the memory 303 (step S406). Subsequently, the image data in the memory is subjected to the image correction (step S407). If the corrected image is from the first original sheet (step S408), then the corrected image data is displayed on the display 304 as an image (step S409). When the user then adjusts the contrast and/or brightness (steps 410) and inputs a command to determine the contrast and/or brightness (step S411), the corrected image data is saved in the hard disk 305 as a first image (step S412). If the corrected image is not from the first original sheet, then the process skips steps S409–S411. Further, settings for the brightness, contrast, and/or the like which have been adjusted and determined using the keyboard are stored in the memory 303 (step S413).

In the same manner as the first original sheet, second and subsequent original sheets are fed by the motors 202 to 206 of the scanner 1 (step S402). When the sensor 207 inputs an image from the original (step S404), the image is transmitted to the PC 2 without being subjected to the image correction (step S405).

In the PC 2, the image transmitted from the scanner 1 is stored in the memory 303 (step S406), and the CPU 301 then executes the image correction using the settings for the brightness, contrast, and/or the like stored in the memory 303 (step S407). Then, the corrected images are saved in the hard disk 305 as second and subsequent images (steps S408 and S412).

The above operations are repeated until there is no original set in the original tray 201 (step S401), the process is terminated due to an error (step S403), or the user inputs a command to suspend the image input, through the keyboard 302 (step S414).

In the above described flow chart, only the first image is adjusted by the user, and the second and subsequent images are automatically adjusted based on the stored settings. The present invention, however, is not limited to this. For example, the number N of original sheets may be set at a number more than one such as five and ten beforehand, and it may be so arranged that the first to N-th images are adjusted by the user and the subsequent images are adjusted based on the settings. In this case, the determining condition at the step S408 is changed to "N-th or Subsequent Original Sheet?".

As described above, according to the second embodiment, it is unnecessary for the user to subject all the original sheets set in the original tray 201 to the image correction for brightness, contrast, and/or the like as desired by the user and to give instructions for the corrections for the second and subsequent original sheets, thereby making the apparatus more convenient to operate. This method is effective when the entire bundle of original sheets requires the same image corrections as the first original sheet.

Third Embodiment

In the third embodiment, if the user determines that the image corrections are to be executed by the PC 2, only a first original sheet is subjected to the image correction by the PC 2, whereas second and subsequent original sheets are subjected to the image correction by the scanner 1.

Figure 11:
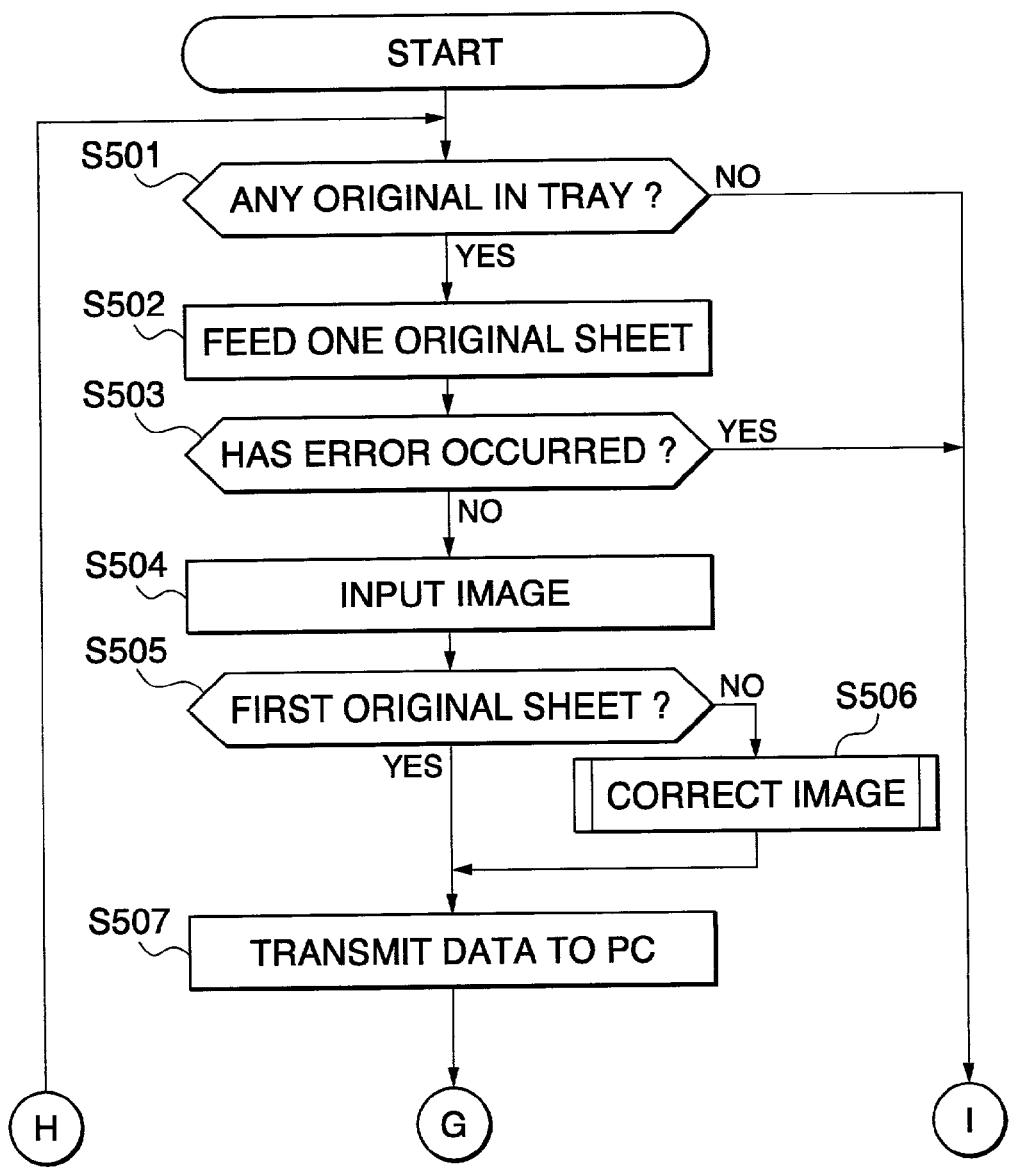
FIG. 11 is a flow chart showing the operation of an image input system according to a third embodiment of the present invention.

FIGS. 11 and 12 are a flow chart showing the operation of an image input system according to the third embodiment of the present invention. FIG. 11 shows an operation on the scanner side, and FIG. 12 shows an operation on the PC side.

In the scanner 1, the sensor 209 detects whether or not any original is set in the tray (step S501). If any original is set therein, the motors 202 to 206 of the scanner 1 feed a first original sheet (step S502). If a feeding error occurs (step S503), the process is terminated. Otherwise, the sensor 207 inputs image data from the first original sheet (step S504). Then, it is determined whether or not the fed original sheet is the first original sheet (the input image data is the first image data). If the fed original sheet is the first original sheet, the input image data is transmitted to the PC 2 without being subjected to the image correction (steps S505 and S507).

In the PC 2, it is first determined whether or not the image data transmitted from the scanner 1 is from the first original sheet (step S508). If the image data is from the first original sheet, the image data is stored in the memory 303 (step S509).

Subsequently, the image data stored in the memory 303 is subjected to the image correction (step S510), and the corrected image data is displayed on the display 304 (step S511).

When the user then adjusts the brightness and/or contrast while referring to the displayed image (step S512) and inputs a command to determine his desired brightness and/or contrast (step S513), the corrected image data is saved in the hard disk 305 as first image data (step S514).

Further, the image correction settings for the determined brightness, contrast and/or the like are transmitted to the scanner 1 through the cable 3 (step S515).

Second and subsequent original sheets are fed by the motors 202 to 206 of the scanner 1 (step S502). When the sensor 207 inputs image data from each original sheet (step S504), the image data is subjected to the image correction according to the settings for the brightness, contrast and/or the like which have been transmitted from the PC 2 (steps S505 and S506). Then, the corrected image data is transmitted to the PC 2 (step S507). In the PC 2, the image data transmitted from the scanner 1 are saved in the hard disk 305 as second and subsequent image data (steps S508 and S514).

The above operations are repeated until there is no original set in the original tray 201 (step S501), the process is terminated due to an error (step S503), or the user inputs a command to suspend the image input, through the keyboard 302 (step S516).

In the above described flow chart, only the first image is adjusted on the PC side, and the second and subsequent images are adjusted on the scanner based on the settings provided by the PC. The present invention, however, is not limited to this. For example, the number N of original sheets may be set at a number more than one such as five and ten beforehand, and it may be so arranged that the first to N-th images are adjusted on the PC side and the subsequent images are adjusted on the scanner side. In this case, the determining conditions at the steps S505 and S508 are changed to "N-th or Subsequent Original Sheet?".

As described above, according to the present embodiment, it is unnecessary for the user to subject all the original sheets set in the original tray 201 to the image corrections for brightness, contrast, and/or the like as desired by the user and to give instructions for the corrections for the second and subsequent original sheets, thereby making the apparatus more convenient to operate. Furthermore, if the image correction processing speed of the scanner 1 exceeds that of the PC 2, a higher processing speed can be achieved compared to the above described second embodiment.

The above described control methods can be realized by storing programs according to the flow charts in FIG. 4 to FIG. 12, in the memory 303 in the PC 2 and executing the programs.

Further, the present invention is not limited to the illustrated embodiments but various modifications thereof may be realized. For example, the image corrections are not limited to the brightness and contrast adjustment but may involve adjustment of other parameters that can be adjusted by the user while viewing the image, such as image edge emphasis and angular correction. Moreover, the present invention may employ an image correction that can be adjusted by the user without viewing the image. Still further, alternatively to designating image correction, the image correction may involve the designation of a scanning area on the original or the like.

The present invention is not limited to the apparatuses of the above described embodiments but may be applied to a system comprised of a plurality of apparatuses or an apparatus comprised of a single apparatus or device. It goes without saying that the present invention can be implemented by supplying a system or an apparatus with a storage medium in which is stored a program code of software that realizes the function of any of the above described embodiments, and causing a computer (or CPU or MPU) of the system or apparatus to read out and execute the program code stored in the storage medium.

In this case, the program code itself read out from the storage medium realizes the functions of any of the above described embodiments, and therefore the storage medium storing the program code constitutes the present invention. The storage medium for supplying the program code may be selected from, for example, a floppy disk, hard disk, optical disk, magneto-optical disk, CD-ROM, CD-R, magnetic tape, non-volatile memory, and ROM. Further, it goes without saying that the functions of the above described embodiments may be accomplished not only by executing the program code read out by the computer, but also by causing an operating system (OS) that operates on the computer to perform a part or the whole of the actual operations according to instructions of the program code.

Furthermore, it is to be understood that the program code read out from the storage medium may be written into a memory provided in an expanded board inserted in the computer, or an expanded unit connected to the computer, and a CPU or the like provided in the expanded board or expanded unit may perform a part or all of the actual process according to instructions of a next program code, so as to accomplish the functions of the above described embodiments.

Although the present invention has been described in terms of the preferred embodiments, it is not limited to the above described embodiments but may be varied and modified within the scope of the appended claims.

What is claimed is:

1. An information processing apparatus connected to an image input apparatus which is capable of executing predetermined image processing on input image data and outputting the processed image data, the information processing apparatus comprising:
    first storing means for storing image data output from the image input apparatus;
    instruction input means for inputting setting information for image processing according to an instruction from an operator; and
    image processing means for executing image processing that can be executed by the image input apparatus, on the image data stored by said first storing means based on the setting information input by said instruction input means;
    selecting means for selecting either a first processing mode in which the image input apparatus executes the image processing on the input image data or a second processing mode in which said image processing means executes the image processing on the image data stored by said first storing means, according to an instruction input by the operator; and
    second storing means for storing the image data on which the image processing is executed,
    wherein said second storing means is operable, when the second processing mode is selected, to store the image data after said first storing means stores the image data output from the image input apparatus and said image processing means executes the image processing on the image data stored by said first storing means, and operable, when the first processing mode is selected, to store the image data, on which the image input apparatus executes the image processing, output from the image input apparatus, without the image data output from the image input apparatus being stored by said first storing means.

2. An information processing apparatus according to claim 1, wherein the image input apparatus is a scanner apparatus having an image processing section that executes predetermined image processing on image data input by reading an image, and
    wherein said first storing means stores image data transmitted from said scanner apparatus.

3. An information processing apparatus according to claim 2, wherein said image processing section of said scanner apparatus executes image processing related to image correction, and said image processing means executes image correction that can be executed by said image processing section of said scanner apparatus.

4. An information processing apparatus according to claim 3, wherein the image correction includes processes related to contrast adjustment, brightness adjustment, and binarization of an image.

5. An information processing apparatus according to claim 2, wherein said scanner apparatus further includes an image input section that feeds an original and inputs image data by reading an image from the fed original.

6. An information processing apparatus according to claim 1, further comprising display means for displaying the image data processed by said image processing means.

7. An information processing apparatus according to claim 6, wherein said image processing means executes image processing on image data temporarily stored by said first storing means and said display means displays the processed image data, before said instruction input means inputs set values.

8. An information processing apparatus according to claim 1, further comprising third storing means for storing setting information input by said instruction input means, and
    wherein said image processing means executes image processing on second and subsequent image data output from the image input apparatus based on the setting information stored in said third storing means.

9. An information processing apparatus according to claim 1, wherein the image input apparatus is a scanner apparatus, and
    wherein the information processing apparatus is a personal computer connected to said scanner apparatus via a communication cable.

10. An information processing apparatus according to claim 1, further comprising transmitting means for transmitting the setting information used for the image processing by said image processing means, to the image input apparatus.

11. An information processing apparatus according to claim 10, wherein said transmitting means transmits the setting information to the image input apparatus after first image data stored by said first storing means has been processed by said image processing means.

12. An information processing apparatus according to claim 11, further comprising display means for displaying the image data processed by said image processing means.

13. An information processing apparatus according to claim 12, wherein the image input apparatus is a scanner apparatus having an image processing section that executes predetermined image processing on image data input by reading an image, and wherein said first storing means stores image data transmitted from said scanner apparatus.

14. An information processing apparatus according to claim 13, wherein said image processing section of said scanner apparatus executes image processing related to image correction based on the setting information transmitted from said transmitting means, and said image processing means executes image correction that can be executed by said image processing section of said scanner apparatus.

15. A method of controlling an information processing apparatus connected to an image input apparatus which is capable of executing predetermined image processing on input image data and outputting the processed image data, the method comprising:
- a first storing step of storing image data output from the image input apparatus, in a first storage section;
- an instruction input step of inputting setting information for image processing according to an instruction from an operator;
- an image processing step of executing image processing that can be executed by the image input apparatus, on the image data stored in the first storage section based on the setting information input in said instruction input step;
- a selecting step of selecting either a first processing mode in which the image input apparatus executes the image processing on the input image data or a second processing mode in which the image processing apparatus executes the image processing on the image data stored in the first storage section, according to an instruction from the operator; and
- a second storing step of storing the image data on which the image processing is executed, in a second storage section,
- wherein the second storage section is operable, when the second processing mode is selected, to store the image data after the first storage section stores the image data output from the image input apparatus and the image processing apparatus executes the image processing on the image data stored in the first storage section, and operable, when the first processing mode is selected, to store the image data, on which the image input apparatus executes the image processing, output from the image input apparatus, without the image data output from the image input apparatus being stored in the first storage section, in said second storing step.

16. A computer-readable storage medium storing a program code for implementing a method of controlling an information processing apparatus connected to an image input apparatus which is capable of executing predetermined image processing on input image data and outputting the processed image data, the program code comprising:
- a first storing module for storing image data output from the image input apparatus, in a first storage section;
- an instruction input module for inputting setting information for image processing according to an instruction from an operator;
- an image processing module for executing image processing that can be executed by the image input apparatus, on the image data stored in the first storage section based on the setting information input by said instruction input module;
- a selecting module for selecting either a first processing mode in which the image input apparatus executes the image processing on the input image data or a second processing mode in which the image processing apparatus executes the image processing on the image data stored in the first storage section, according to an instruction from the operator; and
- a second storing module for storing the image data on which the image processing is executed, in a second storage section,
- wherein the second storage section is operable, when the second processing mode is selected, to store the image data after the first storage section stores the image data output from the image input apparatus and the image processing apparatus executes the image processing on the image data stored in the first storage section, and operable, when the first processing mode is selected, to store the image data, on which the image input apparatus executes the image processing, output from the image input apparatus, without the image data output from the image input apparatus being stored in the first storage section, by said second storing module.

* * * * *